United States Patent
Wu et al.

(10) Patent No.: US 9,584,978 B2
(45) Date of Patent: Feb. 28, 2017

(54) METHOD AND APPARATUS FOR MODULATING GPS SAMPLING FREQUENCY ON TERMINAL DEVICES

(71) Applicant: Anhui Huami Information Technology Co., Ltd., Hefei (CN)

(72) Inventors: Haocheng Wu, Hefei (CN); Hui Wang, Hefei (CN)

(*) Notice: Subject to any disclaimer, the term of this patent is extended or adjusted under 35 U.S.C. 154(b) by 0 days.

(21) Appl. No.: 15/069,461

(22) Filed: Mar. 14, 2016

(65) Prior Publication Data

US 2016/0277897 A1   Sep. 22, 2016

(30) Foreign Application Priority Data

Mar. 16, 2015  (CN) .......................... 2015 1 0113999

(51) Int. Cl.
*H04W 4/02* (2009.01)
*H04L 12/26* (2006.01)

(52) U.S. Cl.
CPC ........... *H04W 4/027* (2013.01); *H04L 43/024* (2013.01)

(58) Field of Classification Search
CPC ............................. H04L 43/024; H04W 4/027
See application file for complete search history.

(56) References Cited

U.S. PATENT DOCUMENTS

| 6,330,446 | B1 | 12/2001 | Mori |
| 7,359,713 | B1 | 4/2008 | Tiwari |
| 2006/0211430 | A1 | 9/2006 | Persico |
| 2009/0024273 | A1* | 1/2009 | Follmer ................. G06Q 10/10 701/33.4 |
| 2011/0215903 | A1 | 9/2011 | Yang et al. |
| 2012/0313777 | A1* | 12/2012 | Zazula ................. G06Q 10/109 340/539.13 |

FOREIGN PATENT DOCUMENTS

| CN | 102075854 A | 5/2011 |
| CN | 103364629 A | 10/2013 |
| CN | 103582093 A | 2/2014 |
| WO | WO 9963360 A2 * | 12/1999 ............. G01C 21/16 |

* cited by examiner

*Primary Examiner* — Dinh P Nguyen
(74) *Attorney, Agent, or Firm* — Young Basile Hanlon & MacFarlane, P.C.

(57) ABSTRACT

Methods and apparatuses are set forth herein for updating a GPS sampling rate used by a terminal device. The method includes determining a current speed of the terminal device and based on the speed of the terminal device, updating a current GPS sampling rate used by the terminal device.

17 Claims, 7 Drawing Sheets

METHOD AND APPARATUS FOR MODULATING GPS SAMPLING FREQUENCY ON TERMINAL DEVICES

CROSS-REFERENCE TO RELATED APPLICATION

This application claims priority to Chinese Patent Application No. CN 201510113999.5, filed on Mar. 16, 2015, which is incorporated in this disclosure in its entirety by reference.

TECHNICAL FIELD

The present disclosure generally relates to mobile communication, and more particularly, to methods and apparatuses for updating GPS sampling rates at terminal devices.

BACKGROUND

Nowadays, positioning systems such as Global Positioning System (GPS) have been widely used in various terminal devices equipped with functions of positioning. When positioning, a GPS function samples data periodically, and records latitude, longitude and an altitude of a terminal device at the time of sampling. Usually, the GPS function samples data with a predetermined rate, i.e., the GPS function samples data with a fixed sampling rate. However, the terminal device has high power consumption when using the GPS function. If the GPS function of the terminal device is switched on at all times, i.e., the GPS function is running even though a position of the terminal device is not changed, the power of the terminal device may be exhausted in a short period of time. As a result, a user cannot use the terminal device, causing inconvenience.

SUMMARY

Disclosed in this disclosure are implementations of methods and apparatuses for updating a sampling rate for a positioning system used by a terminal device.

In one aspect, the present disclosure includes a method for updating a sampling rate for a positioning system used by a terminal device, comprising determining a current speed of the terminal device, and based on the current speed of the terminal device, modulating updating a current sampling rate for the positioning system used by the terminal device.

In another aspect, the present disclosure includes an apparatus for updating a sampling rate for a positioning system used by a terminal device, comprising a determination module, configured to determine a current speed of the terminal device, and an update module, configured to, based on the speed of the terminal device, update a current sampling rate used by the terminal device.

In another aspect, the present disclosure includes a non-transitory computer-readable medium having stored thereon a program of instructions executable by a terminal device to cause the terminal device to determine a current speed of the terminal device, which include, based on a current sampling rate for a positioning system used by the terminal device, receiving, for two consecutive sampling points, first sampling data by sampling at each of the two consecutive sampling points at the terminal device, and based on the first sampling data of the two consecutive sampling points, determining the current speed of the terminal device. The instructions further include instructions to, based on the current speed of the terminal device, update the current sampling rate for the positioning system used by the terminal device, which include, based on a predetermined corresponding relation between a speed and a sampling rate, determining a sampling rate associated with the current speed, wherein in accordance with the predetermined corresponding relation, a higher speed is associated with a higher sampling rate, and updating the current sampling rate to be the sampling rate associated with the current speed.

The embodiments or implementations can be configured as executable computer program instructions stored in computer storages such as memory.

BRIEF DESCRIPTION OF THE DRAWINGS

The description here makes reference to the accompanying drawings wherein like reference numerals refer to like parts throughout the several views, and where.

DETAILED DESCRIPTION

Example implementations of the present disclosure will be described below with reference to the accompanying drawings. The same numbers across the drawings set forth in the following description represent the same or similar elements, unless differently expressed. The implementations set forth in the following description do not represent all implementations or embodiments consistent with the present disclosure; on the contrary, they are only examples of apparatuses and methods in accordance with some aspects of this disclosure as detailed in the claims.

Figure 1:
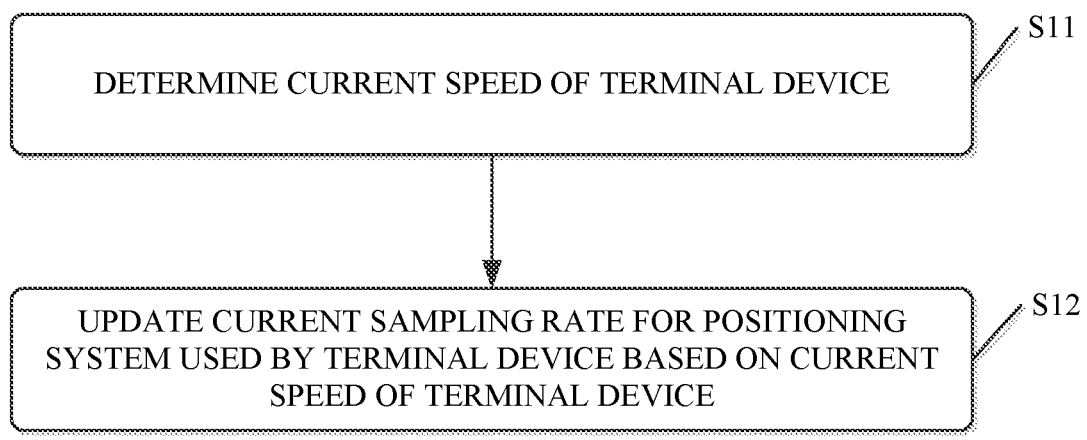
FIG. 1 is a flowchart of an example method for updating a GPS sampling rate used by a terminal device according to implementations of this disclosure.

FIG. 1 is a flowchart of an example method for updating a GPS sampling rate according to implementations of this disclosure. The method can be used at a terminal device. The terminal device in this disclosure can be any computing device that has a function of positioning or locating the computing device using GPS, including but not limited to a wearable device, a personal computer, a laptop computer, a tablet computer, a cell phone, or a personal data assistant (PDA). The wearable device in this disclosure is defined as an apparatus that can be worn at a portion of a human body, such as a wristband, a watch, a ring, a necklace, a clip, a waistband, eyewear, or a head-mounted display. Alternatively, the wearable device in this disclosure can be another portable apparatus configured to travel with but not be worn by an individual, such as a device similar in form to a key fob.

Implementations of this disclosure can, for example, update the current GPS sampling rate in real time based on the current speed, increase GPS sampling efficiency, and realize dynamic update of GPS sampling rates to effectively reduced power consumption of the terminal device.

As shown in FIG. 1, the method includes operations S11-S12.

At operation S11, a current speed of the terminal device is determined.

At operation S12, based on the speed of the terminal device, a current GPS sampling rate used by the terminal device is updated. Updating is defined herein as adjusting, changing, altering, modifying, updating, controlling, or in any manner setting a rate as a different rate.

In implementations of this disclosure, a current GPS sampling rate used by a terminal device can be updated based on a current speed of the terminal device, wherein the current GPS sampling rate is not constant, rather, can be updated in real time based on the current speed; therefore GPS sampling efficiency can be increased as a result of realization of dynamic update of GPS sampling rates, and power consumption of the terminal device can be effectively reduced.

Figure 2:
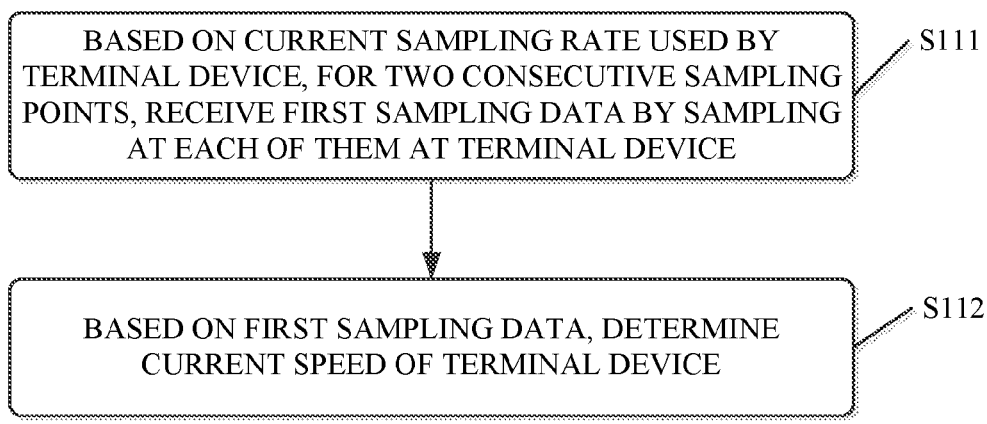
FIG. 2 is a flowchart of operation S11 of the example method for updating a GPS sampling rate used by a terminal device according to implementations of this disclosure.

In some implementations, as shown in FIG. 2, operation S11 can include operations S111-S112.

At operation S111, based on the current GPS sampling rate used by the terminal device, for each of two consecutive sampling points, first sampling data is received by sampling at each of the two consecutive sampling points at the terminal device. Two or more consecutive sampling points can include, for example, two or more sampling points adjacent in space or successive in time, sorted by a temporal order. Receiving is defined herein as receiving, inputting, acquiring, retrieving, obtaining, reading, accessing, determining, or in any manner getting data as input.

For example, the current GPS sampling rate used by the terminal device can be 1 Hz, i.e., the terminal device can sample data in every one second using a GPS module installed therein, to receive sampling data of two consecutive sampling points in time.

At operation S112, based on the first sampling data of the two consecutive sampling points, the current speed of the terminal device is determined.

In some implementations, for each of the two consecutive sampling points, the first sampling data can include time data and position data. Therefore, for example, operation S112 can be implemented as operations A1-A2.

At operation A1, based on the time data and the position data of the two consecutive sampling points, a time difference and a distance difference between the two consecutive sampling points are determined.

At operation A2, based on the time difference and the distance difference between the two consecutive sampling points, the current speed of the terminal device is determined.

In some implementations, the position data for each sampling point can include data of, for example, latitude, longitude, and altitude on Earth. Based on the position data of each sampling point, a distance difference between two consecutive sampling points, Dn, can be calculated. For example, quantitative changes of latitude and longitude can be used in the calculation of Dn. Based on the time data of each sampling point, a time difference between two consecutive sampling points, Tn, can be calculated. For example, if the current GPS sampling rate is 1 Hz, Tn is one second. Therefore, the current speed of the terminal device can be determined as, for example, a ratio of Dn/Tn.

Figure 3:
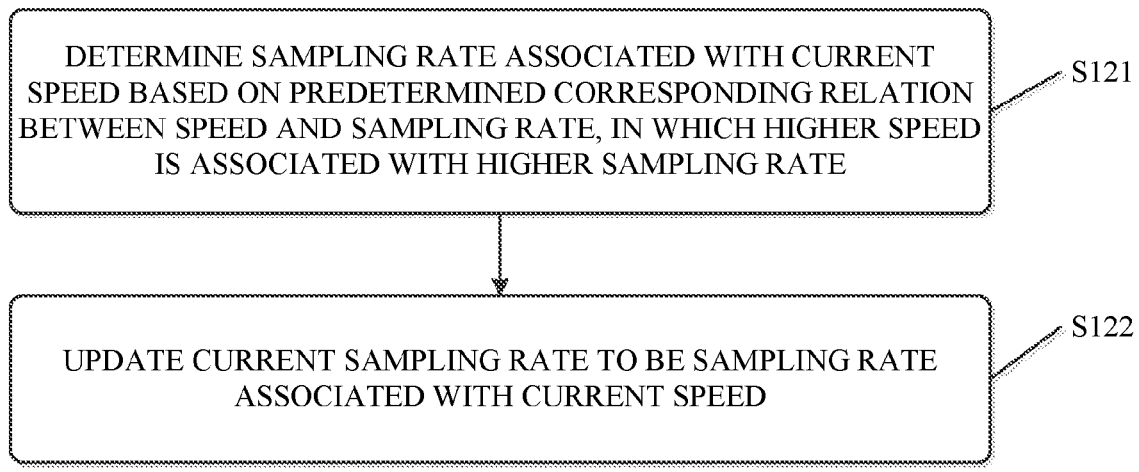
FIG. 3 is a flowchart of operation S12 of the example method for updating a GPS sampling rate used by a terminal device according to implementations of this disclosure.

In some implementations, as shown in FIG. 3, operation S12 can be implemented as operations S121-S122.

At operation S121, based on a predetermined corresponding relation between a speed and a GPS sampling rate, a GPS sampling rate associated with the current speed is determined, wherein according to the predetermined corresponding relation, a higher speed is associated with a higher GPS sampling rate.

At operation S122, the current GPS sampling rate is updated to be the GPS sampling rate associated with the current speed.

In some implementations, according to the predetermined corresponding relation between a speed and a GPS sampling rate, the higher the speed is, the higher is the GPS sampling rate; on the contrary, the lower the speed is, the lower is the GPS sampling rate. Table 1 is an example of the predetermined corresponding relation between a speed and a GPS sampling rate according to some implementations. In Table 1, a range of speeds corresponds to a sampling rate, i.e., 0 m/s~1 m/s corresponds to a sampling rate of F1, 1 m/s~3 m/s corresponds to a sampling rate of F2, and 3 m/s~∞ (infinity) corresponds to a sampling rate of F3, wherein F1<F2<F3.

TABLE 1

| Speed | GPS sampling rate |
|---|---|
| 0 m/s~1 m/s | F1 |
| 1 m/s~3 m/s | F2 |
| 3 m/s~∞ | F3 |

Figure 4:
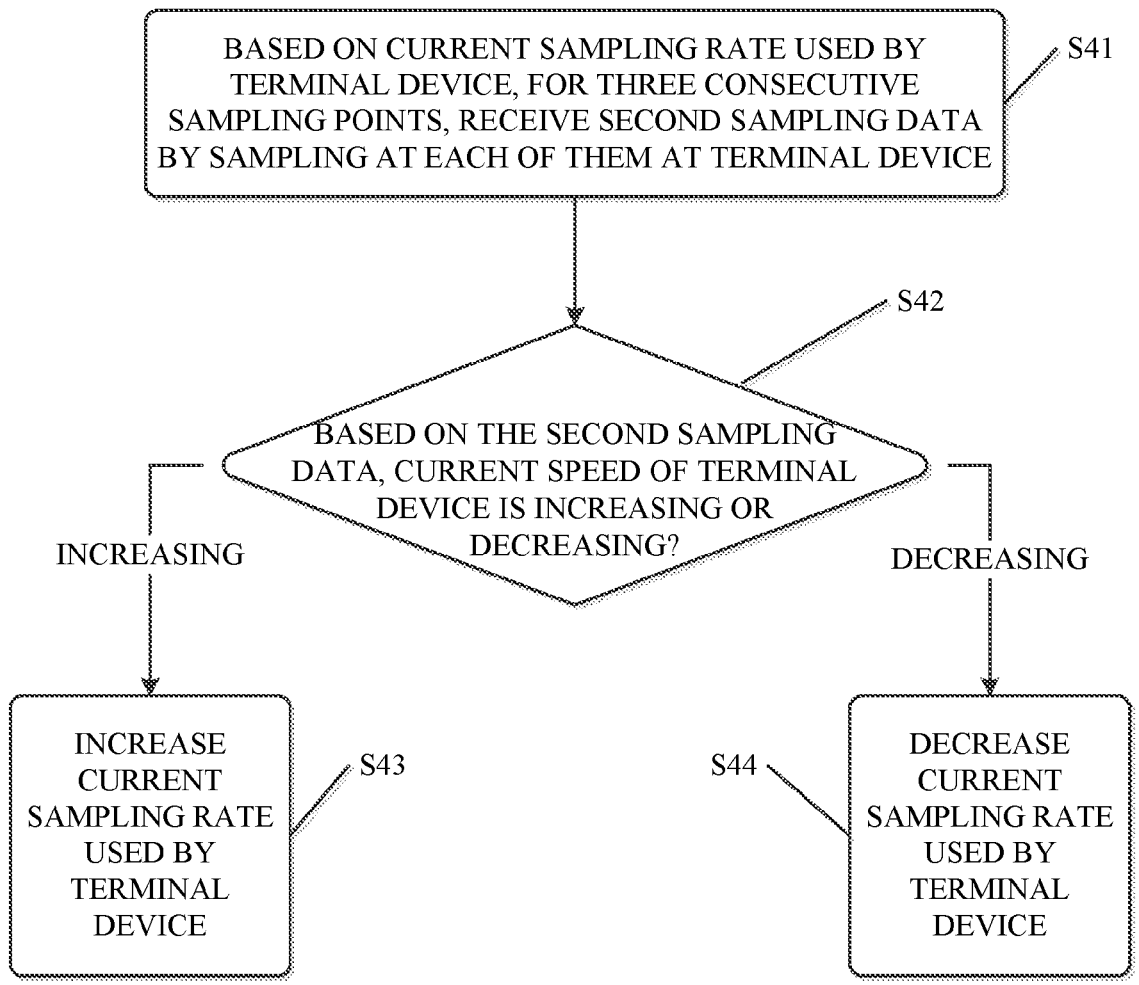
FIG. 4 is a flowchart of another example method for updating a GPS sampling rate used by a terminal device according to implementations of this disclosure.

In some implementations, as shown in FIG. 4, the aforementioned method can further include operations S41-S44.

At operation S41, based on the current GPS sampling rate used by the terminal device, for each of three consecutive sampling points, second sampling data is received by sampling at each of the three consecutive sampling points at the terminal device, wherein the three consecutive sampling points comprise a first sampling point, a second sampling point, and a third sampling point in sequence.

At operation S42, based on the second sampling data of the three consecutive sampling points, it is determined whether the current speed of the terminal device is increasing or decreasing. If the current speed of the terminal device is determined to be increasing, this process proceeds to operation S43. If the current speed of the terminal device is determined to be decreasing, this process proceeds to operation S44.

At operation S43, the current GPS sampling rate used by the terminal device is increased.

At operation S44, the current GPS sampling rate used by the terminal device is decreased.

In some implementations, when updating (e.g., increasing or decreasing) the current GPS sampling rate, the update can be executed by a predetermined step (e.g., 1 Hz) within a predetermined range of sampling rates. For example, when the current speed of the terminal device is increasing, the current GPS sampling rate can be increased by 1 Hz. When the current speed of the terminal device is increasing again, the current GPS sampling rate can be increased by 1 Hz again. In some implementations, the current GPS sampling rate can be updated based on amplitude of change of the current speed of the terminal device. For example, when the current speed of the terminal device is increasing dramatically, the current GPS sampling rate can be increased by n-fold of the predetermined step, wherein n can be a positive integer greater than or equal to 1.

In some implementations, operation S42 can be implemented as operations B1-B2.

At operation B1, based on sampling data of the first and second sampling points of the three consecutive sampling points, a first speed of the terminal device is determined, and based on sampling data of the second and third sampling points of the three consecutive sampling points, a second speed of the terminal device is determined.

At operation B2, based on a difference between the first speed and the second speed, it is determined whether the current speed of the terminal device is increasing or decreasing.

In implementations of this disclosure, a current GPS sampling rate used by a terminal device can be increased or decreased based on the increasing or decreasing of a current speed of the terminal device; therefore dynamic update of GPS sampling rates can be realized, and power consumption of the terminal device can be effectively reduced.

Figure 5:
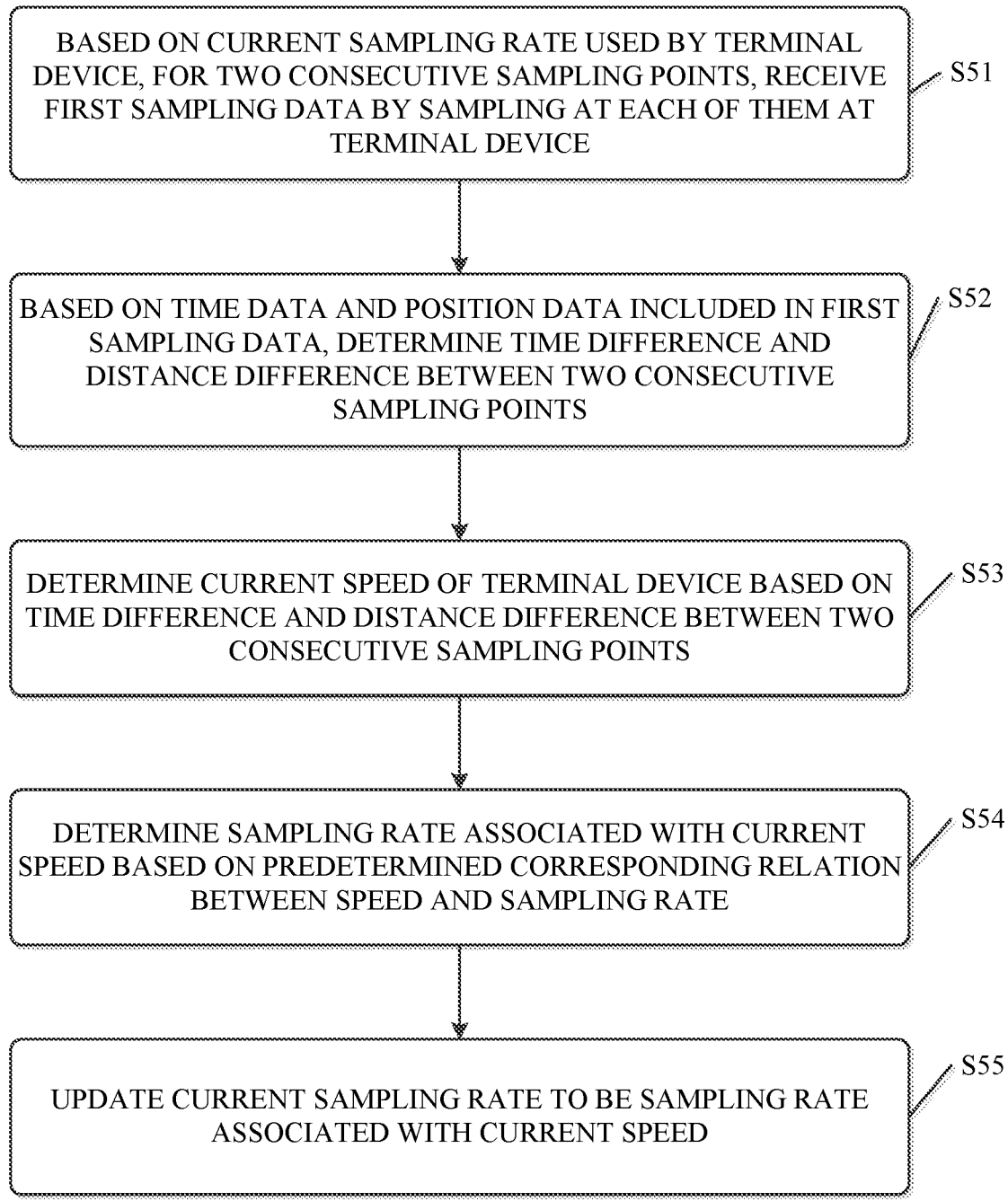
FIG. 5 is a flowchart of another example method for updating a GPS sampling rate used by a terminal device according to implementations of this disclosure.

FIG. 5 is a flowchart of another example method for updating a GPS sampling rate used by a terminal device according to implementations of this disclosure. In some implementations, a current GPS sampling rate used by a terminal device is updated based on a predetermined corresponding relation between a speed and a GPS sampling rate. For example, in the following description, the predetermined corresponding relation between a speed and a GPS sampling rate can be presented in Table 1. As shown in FIG. 5, this method includes operations S51-S55.

At operation S51, based on the current GPS sampling rate used by the terminal device, for each of two consecutive sampling points, first sampling data is received by sampling at each of the two consecutive sampling points at the terminal device. For example, the current GPS sampling rate can be ½ Hz, and data can be sampled by the terminal device at the first second (i.e., a first sampling) and at the third second (i.e., a second sampling), wherein the data received from the first sampling and the second sampling is the first sample data of the two consecutive sampling points.

At operation S52, based on time data and position data included in the first sampling data of the two consecutive sampling points, a time difference and a distance difference between the two consecutive sampling points are determined.

At operation S53, based on the time difference and the distance difference between the two consecutive sampling points, the current speed of the terminal device is determined.

At operation S54, based on a predetermined corresponding relation between a speed and a GPS sampling rate, a GPS sampling rate associated with the current speed is determined. For example, the GPS sampling rate associated with the current speed can be determined by querying the corresponding relation presented in Table 1.

At operation S55, the current GPS sampling rate is updated to be the GPS sampling rate associated with the current speed.

In implementations of this disclosure, by determining a current speed of a terminal device, a current GPS sampling rate used by the terminal device can be updated based on a predetermined corresponding relation between a speed and a GPS sampling rate, wherein the current GPS sampling rate is not constant, rather, can be updated in real time based on the current speed; therefore GPS sampling efficiency can be increased as a result of realization of dynamic update of GPS sampling rates, and power consumption of the terminal device can be effectively reduced.

The following are example apparatuses and components thereof for updating a GPS sampling rate used by a terminal device according to implementations of this disclosure. One such apparatus can be any computing device as set forth in foregoing description. In some implementations, the computing device can include one or more components such as a processing device or a processor, a memory, a storage device, an input device, an output device, a communication device, and one or more modules for specific purposes. The embodiments of modules 61-66 and submodules thereof in this disclosure can be implemented by computer software, hardware, firmware, logic circuits (like ASIC), or their combinations.

Figure 6:
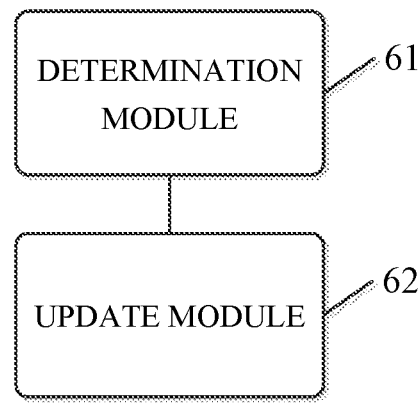
FIG. 6 is a diagram of an example apparatus for updating a GPS sampling rate used by a terminal device according to implementations of this disclosure.

FIG. 6 is a box diagram of an example apparatus for updating a GPS sampling rate used by a terminal device according to implementations of this disclosure. As shown in FIG. 6, the apparatus includes modules 61-62.

Determination module 61 is configured to determine a current speed of the terminal device.

Update module 62 is configured to update a current GPS sampling rate used by the terminal device based on the speed of the terminal device.

Figure 7:
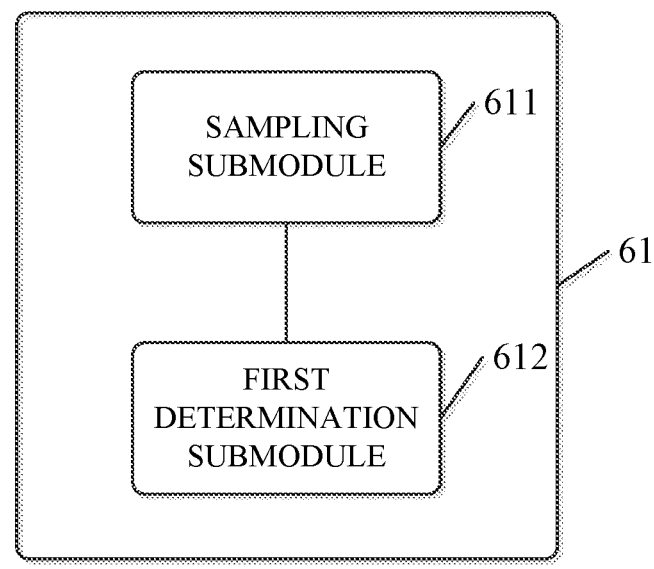
FIG. 7 is a diagram of a determination module of an example apparatus for updating a GPS sampling rate used by a terminal device according to implementations of this disclosure.

In some implementations, as shown in FIG. 7, determination module 61 includes submodules 611-612.

Sampling submodule 611 is configured to, for each of two consecutive sampling points, receive first sampling data by sampling at each of the two consecutive sampling points at the terminal device based on the current GPS sampling rate used by the terminal device, wherein the first sampling data includes, for each of the two consecutive sampling points, time data and position data.

First determination submodule 612 is configured to determine the current speed of the terminal device based on the first sampling data of the two consecutive sampling points.

Figure 8:
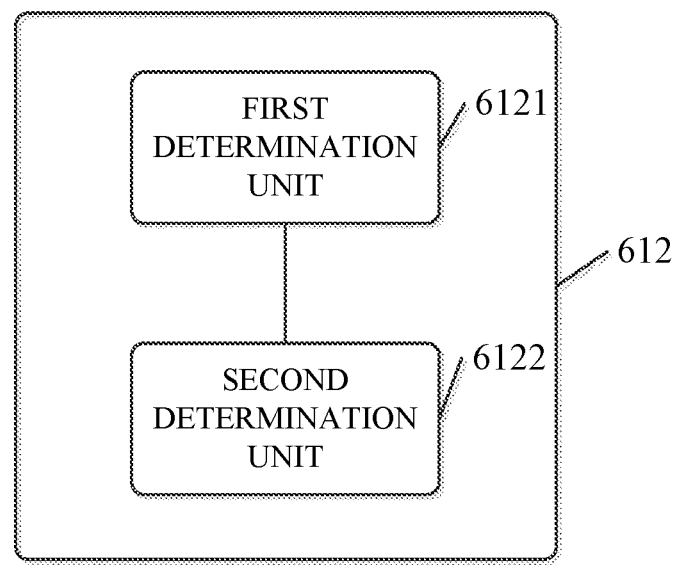
FIG. 8 is a diagram of a first determination submodule of an example apparatus for updating a GPS sampling rate used by a terminal device according to implementations of this disclosure.

In some implementations, as shown in FIG. 8, first determination submodule 612 includes units 6121-6122.

First determination unit 6121 is configured to determine a time difference and a distance difference between the two consecutive sampling points based on the time data and the position data of the two consecutive sampling points.

Second determination unit 6122 is configured to determine the current speed of the terminal device based on the time difference and the distance difference between the two consecutive sampling points.

Figure 9:
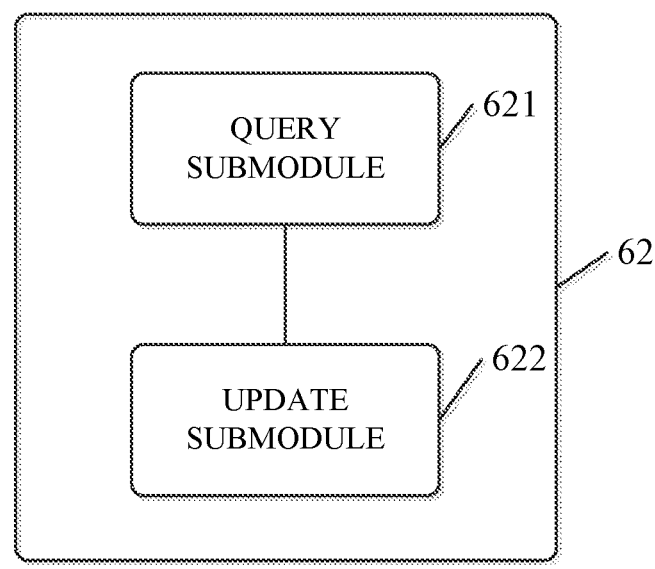
FIG. 9 is a diagram of an update module of an example apparatus for updating a GPS sampling rate used by a terminal device according to implementations of this disclosure.

In some implementations, as shown in FIG. 9, update module 62 includes submodules 621-622.

Query submodule 621 is configured to determine a GPS sampling rate associated with the current speed based on a predetermined corresponding relation between a speed and a GPS sampling rate, according to which a higher speed is associated with a higher GPS sampling rate.

Update submodule 622 is configured to update the current GPS sampling rate to be the GPS sampling rate associated with the current speed.

Figure 10:
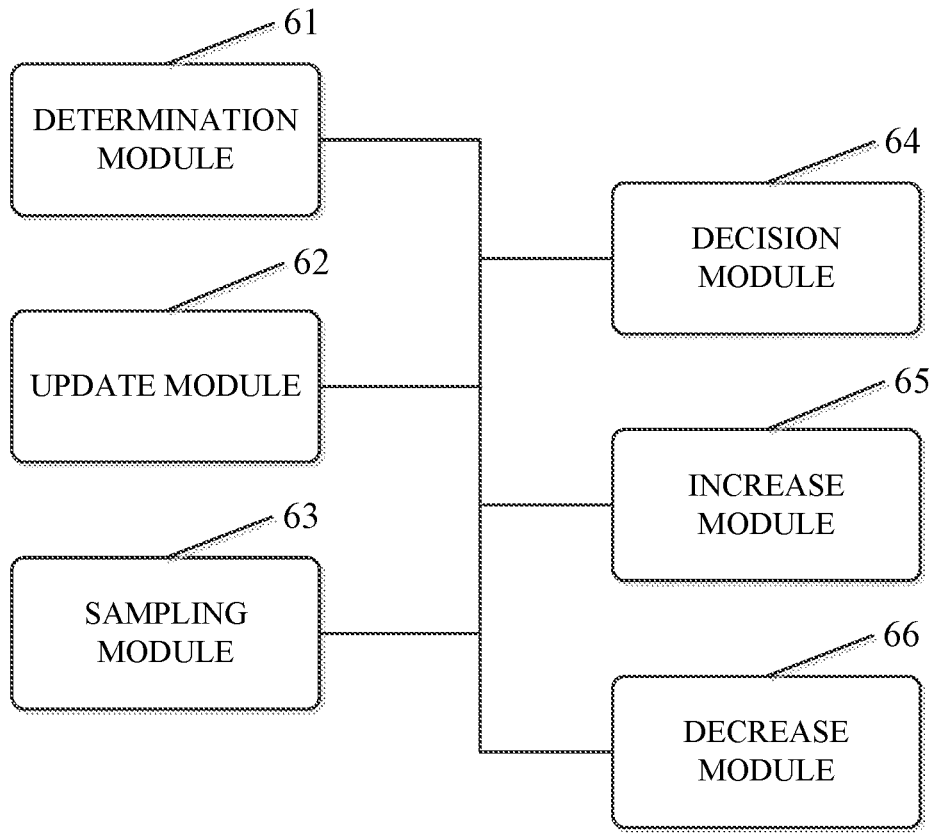
FIG. 10 is a diagram of another example apparatus for updating a GPS sampling rate used by a terminal device according to implementations of this disclosure.

In some implementations, as shown in FIG. 10, the aforementioned apparatus further includes modules 63-66.

Sampling module 63 is configured to, for each of three consecutive sampling points, receive second sampling data by sampling at each of the three consecutive sampling points at the terminal device based on the current GPS sampling rate used by the terminal device, wherein the three consecutive sampling points comprise a first sampling point, a second sampling point, and a third sampling point in sequence.

Decision module 64 is configured to determine whether the current speed of the terminal device is increasing or decreasing based on the second sampling data of the three consecutive sampling points.

Increase module 65 is configured to increase the current GPS sampling rate used by the terminal device based on a determination that the current speed of the terminal device is increasing.

Decrease module 66 is configured to decrease the current GPS sampling rate used by the terminal device based on a determination that the current speed of the terminal device is decreasing.

Figure 11:
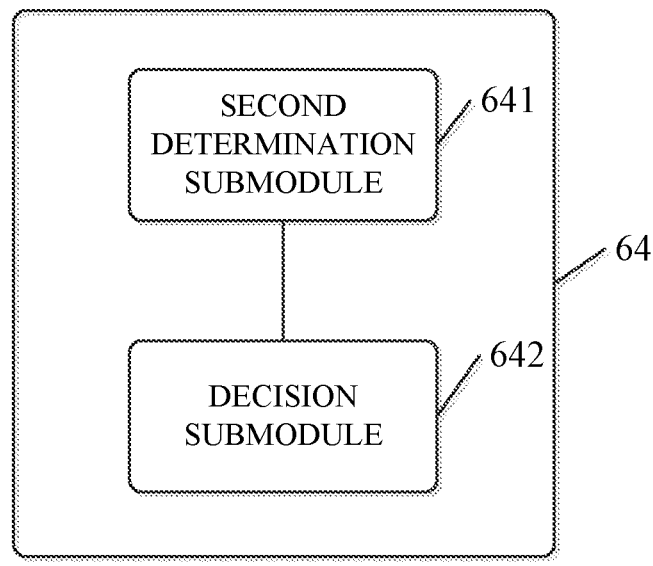
FIG. 11 is a diagram of a decision module of another example apparatus for updating a GPS sampling rate used by a terminal device according to implementations of this disclosure.

In some implementations, as shown in FIG. 11, decision module 64 includes submodules 641-642.

Second determination submodule 641 is configured to determine a first speed of the terminal device based on sampling data of the first and second sampling points of the three consecutive sampling points and determine a second speed of the terminal device based on sampling data of the second and third sampling points of the three consecutive sampling points.

Decision submodule 642 is configured to determine whether the current speed of the terminal device is increasing or decreasing based on a difference between the first speed and the second speed.

In implementations of this disclosure, a current GPS sampling rate used by a terminal device can be updated based on a current speed of the terminal device, wherein the current GPS sampling rate is not constant, rather, can be updated in real time based on the current speed; therefore GPS sampling efficiency can be increased as a result of realization of dynamic update of GPS sampling rates, and power consumption of the terminal device can be effectively reduced.

Note that, the aforementioned method and apparatus for modulating GPS sampling frequency on terminal devices according to implementations in this disclosure is described by examples based on functions of the aforementioned modules. In practical applications, the functions can be distributed to be implemented by different functional modules based on needs, i.e., internal structures of apparatuses can be divided into different functional modules purporting to implement the foregoing functions in complete or in part. Moreover, according to implementations in this disclosure, the aforementioned methods and apparatuses for modulating GPS sampling frequency on terminal devices share the same conception, the specific processes for implementation of which have been described in foregoing implementations and examples, therefore will not be discussed further hereinafter.

Technical specialists skilled in the art should understand that, the implementations in this disclosure can be implemented as methods, systems, or computer program products. Therefore, this disclosure can be implemented in forms of a complete hardware implementation, a complete software implementation, and a combination of software and hardware implementation. Further, this disclosure can be embodied as a form of one or more computer program products which are embodied as computer executable program codes in computer writable storage media (including but not limited to disk storage and optical storage).

This disclosure is described in accordance with the methods, devices (systems), and flowcharts and/or block diagrams of computer program products of the implementations, which should be comprehended as each flow and/or block of the flowcharts and/or block diagrams implemented by computer program instructions, and the combinations of flows and/or blocks in the flowcharts and/or block diagrams. The computer program instructions therein can be provided to generic computers, special-purpose computers, embedded computers or other processors of programmable data processing devices to produce a machine, wherein the instructions executed by the computers or the other processors of programmable data processing devices produce an apparatus for implementing the functions designated by one or more flows in the flowcharts and/or one or more blocks in the block diagrams.

The computer program instructions can be also stored in a computer readable storage which is able to boot a computer or other programmable data processing device to a specific work mode, wherein the instructions stored in the computer readable storage produce a manufactured product containing the instruction devices which implements the functions designated by one or more flows in the flowcharts and/or one or more blocks in the block diagrams.

The computer program instructions can also be loaded to a computer or another programmable data processing device to execute a series of operating procedures in the computer or the other programmable data processing device to produce a process implemented by the computer, by which the computer program instructions executed in the computer or the other programmable data processing device provide the operating procedures for the functions designated by one or more flows in the flowcharts and/or one or more blocks in the block diagrams.

Apparently, the technical specialists skilled in the art can perform any variation and/or modification to this disclosure by the principles and within the scope of this disclosure. Therefore, if the variations and modifications in this disclosure are within the scope of the claims and other equivalent techniques herein, this disclosure intends to include the variations and modifications thereof.

What is claimed is:

1. A method for updating a current sampling rate for a positioning system used by a terminal device, comprising:
   determining a current speed of the terminal device;
   receiving, for three consecutive sampling points, second sampling data by sampling at each of the three consecutive sampling points at the terminal device, wherein the three consecutive sampling points comprise a first sampling point, a second sampling point, and a third sampling point in sequence;
   based on the second sampling data of the three consecutive sampling points, determining whether the current speed of the terminal device is increasing or decreasing;
   based on a determination that the current speed of the terminal device is increasing, determining whether a rate at which the current speed is increasing exceeds a predetermined rate;

based on a determination that the rate at which the current speed of the terminal device does not exceed the predetermined rate, increasing the current sampling rate for the positioning system used by the terminal device by a predetermined step within a predetermined range; and based on a determination that the rate at which the current speed is increasing exceeds the predetermined rate, increasing the current sampling rate for the positioning system used by the terminal device by n-fold of the predetermined step within the predetermined range.

2. The method of claim 1, wherein the determining the current speed of the terminal device comprises:

receiving, for two consecutive sampling points, first sampling data by sampling at each of the two consecutive sampling points at the terminal device; and based on the first sampling data of the two consecutive sampling points, determining the current speed of the terminal device.

3. The method of claim 2, wherein the first sampling data comprises, for each of the two consecutive sampling points, time data and position data, and based on the first sampling data of the two consecutive sampling points, the determining the current speed of the terminal device comprises:

based on the time data and the position data of the two consecutive sampling points, determining a time difference and a distance difference between the two consecutive sampling points; and based on the time difference and the distance difference between the two consecutive sampling points, determining the current speed of the terminal device.

4. The method of claim 1, wherein based on the second sampling data of the three consecutive sampling points, the determining whether the current speed of the terminal device is increasing or decreasing comprises:

based on sampling data of the first sampling point and the second sampling point of the three consecutive sampling points, determining a first speed of the terminal device;

based on sampling data of the second sampling point and the third sampling point of the three consecutive sampling points, determining a second speed of the terminal device; and based on a difference between the first speed and the second speed, determining whether the current speed of the terminal device is increasing or decreasing.

5. The method of claim 1, wherein the positioning system comprises a Global Positioning System (GPS), and the current sampling rate for the positioning system comprises a GPS sampling rate.

6. An apparatus for updating a sampling rate for a positioning system used by a terminal device, comprising:

a non-transitory memory; and a processor configured to execute instructions stored in the non-transitory memory to:

determine a current speed of the terminal device;

receiving, for three consecutive sampling points, second sampling data by sampling at each of the three consecutive sampling points at the terminal device, wherein the three consecutive sampling points comprise a first sampling point, a second sampling point, and a third sampling point in sequence;

based on the second sampling data of the three consecutive sampling points determine whether the current speed of the terminal device is increasing or decreasing;

based on a determination that the current speed of the terminal device is increasing, determine whether a rate at which the current speed is increasing exceeds a predetermined rate;

based on a determination that the rate at which the current speed of the terminal device does not exceed the predetermined rate, increase the sampling rate for the positioning system used by the terminal device by a predetermined step with a predetermined range; and based on a determination that the rate at which the current speed is increasing exceeds the predetermined rate, increase the sampling rate for the positioning system used by the terminal device by n-fold of the predetermined step within the predetermined range.

7. The apparatus of claim 6, wherein the instructions to determine the current speed of the terminal device further comprise instructions to:

receive, for two consecutive sampling points, first sampling data by sampling at each of the two consecutive sampling points at the terminal device, wherein the first sampling data comprises, for each of the two consecutive sampling points, time data and position data; and based on the first sampling data of the two consecutive sampling points, determine the current speed of the terminal device.

8. The apparatus of claim 7, wherein the instructions to, based on the first sampling data of the two consecutive sampling points, determine the current speed of the terminal device, further comprise instructions to:

based on the time data and the position data of the two consecutive sampling points, determine a time difference and a distance difference between the two consecutive sampling points; and based on the time difference and the distance difference between the two consecutive sampling points, determine the current speed of the terminal device.

9. The apparatus of claim 6, wherein the instructions stored in the non-transitory memory further comprise:

based on a determination that the current speed of the terminal device is decreasing, decrease the sampling rate used by the terminal device.

10. The apparatus of claim 6, wherein the instructions to, based on the second sampling data of the three consecutive sampling points, determine whether the current speed of the terminal device is increasing or decreasing further comprise instructions to:

based on second sampling data of the first sampling point and the second sampling point of the three consecutive sampling points, determine a first speed of the terminal device, based on second sampling data of the second sampling point and the third sampling point of the three consecutive sampling points, determine a second speed of the terminal device; and based on a difference between the first speed and the second speed, determine whether the current speed of the terminal device is increasing or decreasing.

11. The apparatus of claim 6, wherein the positioning system comprises a Global Positioning System (GPS), and the sampling rate for the positioning system comprises a GPS sampling rate.

12. A non-transitory computer-readable medium having stored thereon a program of instructions executable by a terminal device to cause the terminal device to:

determine a current speed of the terminal device, wherein the instructions to determine the current speed of the terminal device further comprise instructions to:
    receive, for two consecutive sampling points, first sampling data by sampling at each of the two consecutive sampling points at the terminal device; and
    based on the first sampling data of the two consecutive sampling points, determine the current speed of the terminal device;

determine whether the current speed of the terminal device is increasing or decreasing, wherein the instructions to determine whether the current speed of the terminal device is increasing or decreasing further comprise instructions to:
    receive, for three consecutive sampling points. second sampling data by sampling at each of the three consecutive sampling points at the terminal device, wherein the three consecutive sampling points comprise a first sampling point, a second sampling point, and a third sampling point in sequence;
    based on the second sampling data of the three consecutive sampling points, determining whether the current speed of the terminal device is increasing or decreasing;

based on a determination that the current speed of the terminal device is increasing, determine whether a rate at which the current speed is increasing exceeds a predetermined rate;

based on a determination that the rate at which the current speed of the terminal device is increasing does not exceed the predetermined rate, increase a current sampling rate for a positioning system used by the terminal device by a predetermined step within a predetermined range; and based on a determination that the rate at which the current speed is increasing exceeds the predetermined rate, increase the current sampling rate for the positioning system used by the terminal device by n-fold of the predetermined step within the predetermined range.

13. The non-transitory computer-readable medium of claim 12, wherein the first sampling data comprises, for each of the two consecutive sampling points, time data and position data, and based on the first sampling data of the two consecutive sampling points, and the instructions to determine the current speed of the terminal device comprise instructions to:
    based on the time data and the position data of the two consecutive sampling points, determine a time difference and a distance difference between the two consecutive sampling points; and
    based on the time difference and the distance difference between the two consecutive sampling points, determine the current speed of the terminal device.

14. The non-transitory computer-readable medium of claim 12, wherein the instructions to determine whether the current speed of the terminal device is increasing or decreasing comprise instructions to:
    based on sampling data of the first sampling point and the second sampling point of the three consecutive sampling points, determine a first speed of the terminal device;
    based on sampling data of the second sampling point and the third sampling point of the three consecutive sampling points, determine a second speed of the terminal device; and
    based on a difference between the first speed and the second speed, determine whether the current speed of the terminal device is increasing or decreasing.

15. The non-transitory computer-readable medium of claim 12, wherein the positioning system comprises a Global Positioning System (GPS), and the current sampling rate for the positioning system comprises a GPS sampling rate.

16. The non-transitory computer-readable medium of claim 12, wherein n is a positive integer greater than 1.

17. The method of claim 1, wherein n is a positive integer greater than 1.

* * * * *